United States Patent [19]
Dominitz et al.

[11] Patent Number: 5,895,512
[45] Date of Patent: Apr. 20, 1999

[54] PROCESS FOR THE MANUFACTURE OF AN OBJECT DISPLAYING A MESSAGE

[76] Inventors: Jacques Charles Dominitz, 5, Square Capitaine Claude-Barres, F-92200 Neuilly-sur-Seine; Jean Régis Coupechoux, 17, rue de la Chatterie, F-89130 Toucy, both of France

[21] Appl. No.: 08/436,206

[22] PCT Filed: Nov. 10, 1993

[86] PCT No.: PCT/FR93/01108

§ 371 Date: Jul. 13, 1995

§ 102(e) Date: Jul. 13, 1995

[87] PCT Pub. No.: WO94/11316

PCT Pub. Date: May 26, 1994

[30] Foreign Application Priority Data

Nov. 13, 1992 [FR] France ............... 92 13687

[51] Int. Cl.⁶ .................. C03B 9/00; C03B 11/00; C03B 13/00; C03B 15/00
[52] U.S. Cl. ................. 65/59.6; 65/66; 65/126; 65/127; 264/60; 264/132
[58] Field of Search ............ 65/60, 66, 59.6, 65/126, 127, 143; 264/60, 132; 427/226, 287; 428/13, 46, 49; 40/358, 661

[56] References Cited

U.S. PATENT DOCUMENTS

| | | | |
|---|---|---|---|
| 777,305 | 12/1904 | Priestnall | 40/661 |
| 1,529,947 | 4/1925 | Freese . | |
| 1,734,965 | 11/1929 | Danner . | |
| 1,946,879 | 2/1934 | Peltier | 49/55 |
| 2,371,213 | 3/1945 | Batchell | 49/54 |
| 3,047,409 | 7/1962 | Slayter et al. | 106/47 |
| 3,186,812 | 6/1965 | Pfaender | 65/55 |
| 3,506,421 | 4/1970 | Weber | 65/21 |
| 4,040,724 | 8/1977 | Klingler | 350/239 |
| 4,339,489 | 7/1982 | Barker et al. | 428/167 |
| 4,381,932 | 5/1983 | Olson et al. | 65/66 |
| 4,609,392 | 9/1986 | Claisse | 65/134 |
| 5,235,853 | 8/1993 | Froes | 73/427 |
| 5,322,541 | 6/1994 | Shimizu et al. | 65/66 |
| 5,364,432 | 11/1994 | Leber | 65/17.3 |
| 5,499,597 | 3/1996 | Kronberg | 116/216 |

FOREIGN PATENT DOCUMENTS

| | | |
|---|---|---|
| 56-106971 | 8/1981 | Japan . |
| 1448080 | 9/1976 | United Kingdom . |
| WO80/01684 | 8/1980 | WIPO . |

OTHER PUBLICATIONS

Webster's Ninth New Collegiate Dictionary, p. 409, 1986.

*Primary Examiner*—Donald E. Czaja
*Assistant Examiner*—Jacqueline A. Ruller
*Attorney, Agent, or Firm*—Jacobson, Price, Holman & Stern, PLLC

[57] ABSTRACT

A process for the manufacture of an object displaying a message includes the following steps: preparation of a support for the message having dimensions less than the dimensions of the object; manual or automatic application of the message to the support; introduction of the support carrying the message on its surface into a molten transparent material so as to surround the support with a sufficient quantity of molten transparent material to enable subsequent formation of a transparent body which completely surrounds the support; and formation of the transparent body by thermomechanical means.

2 Claims, 4 Drawing Sheets

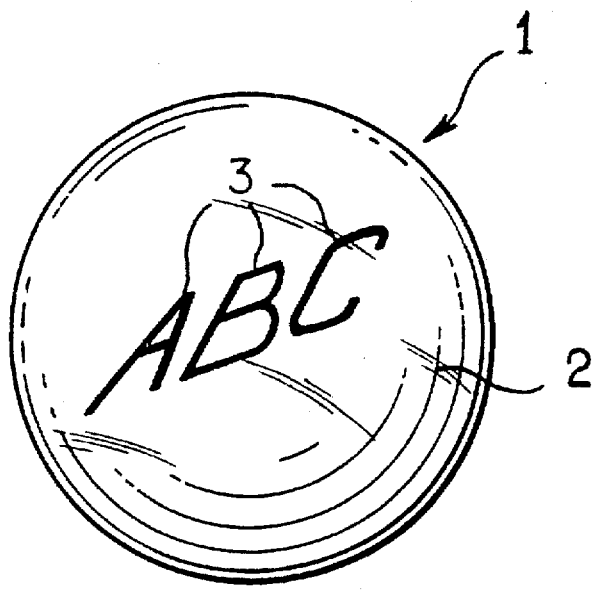
FIG_1
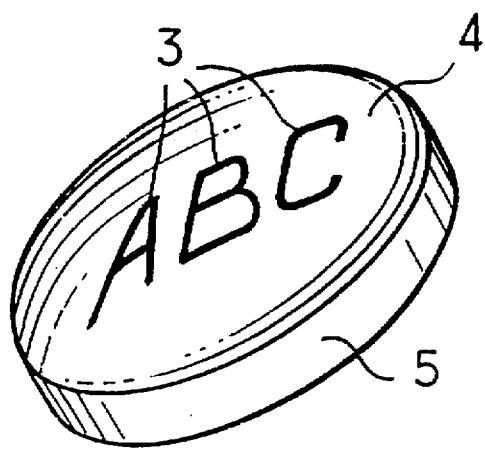
FIG_2

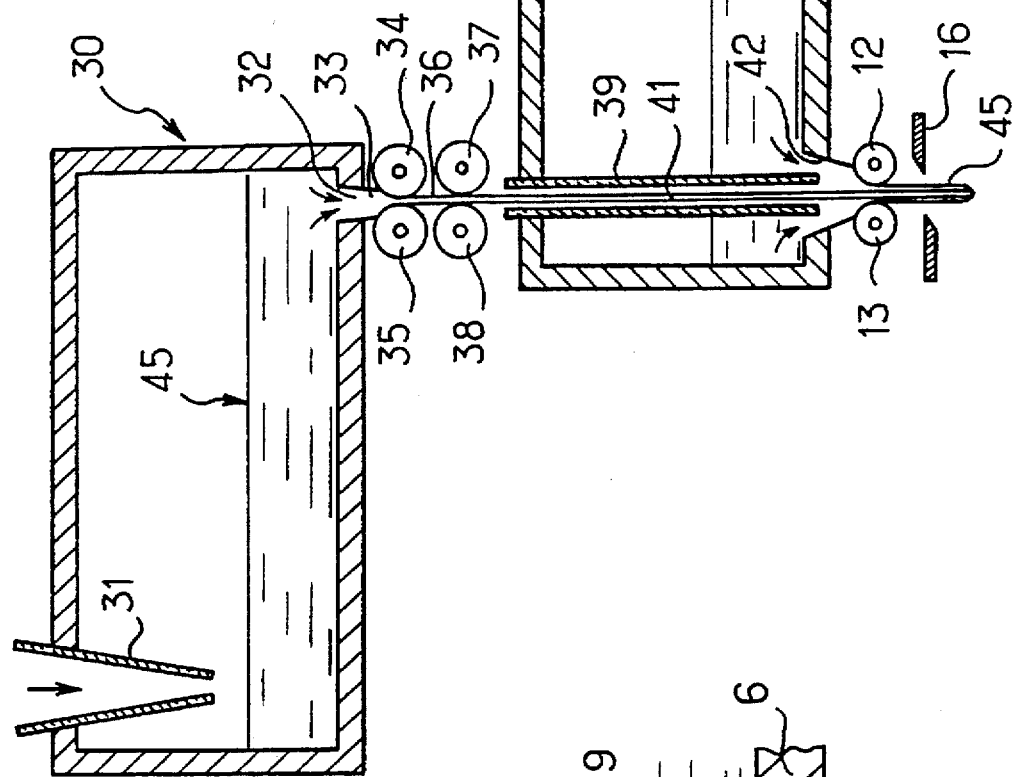
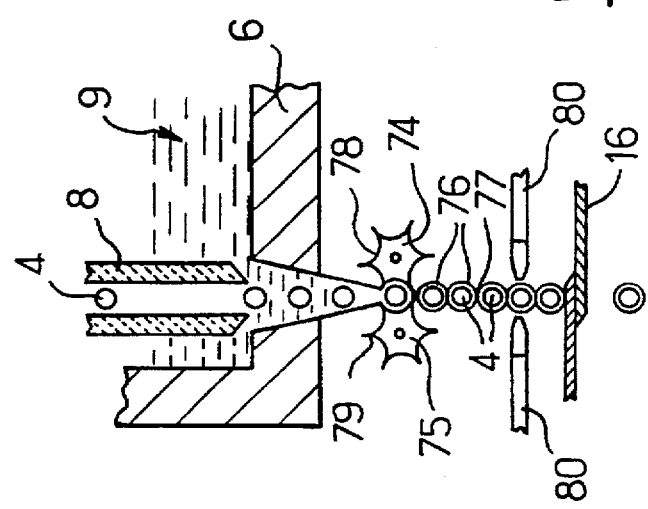

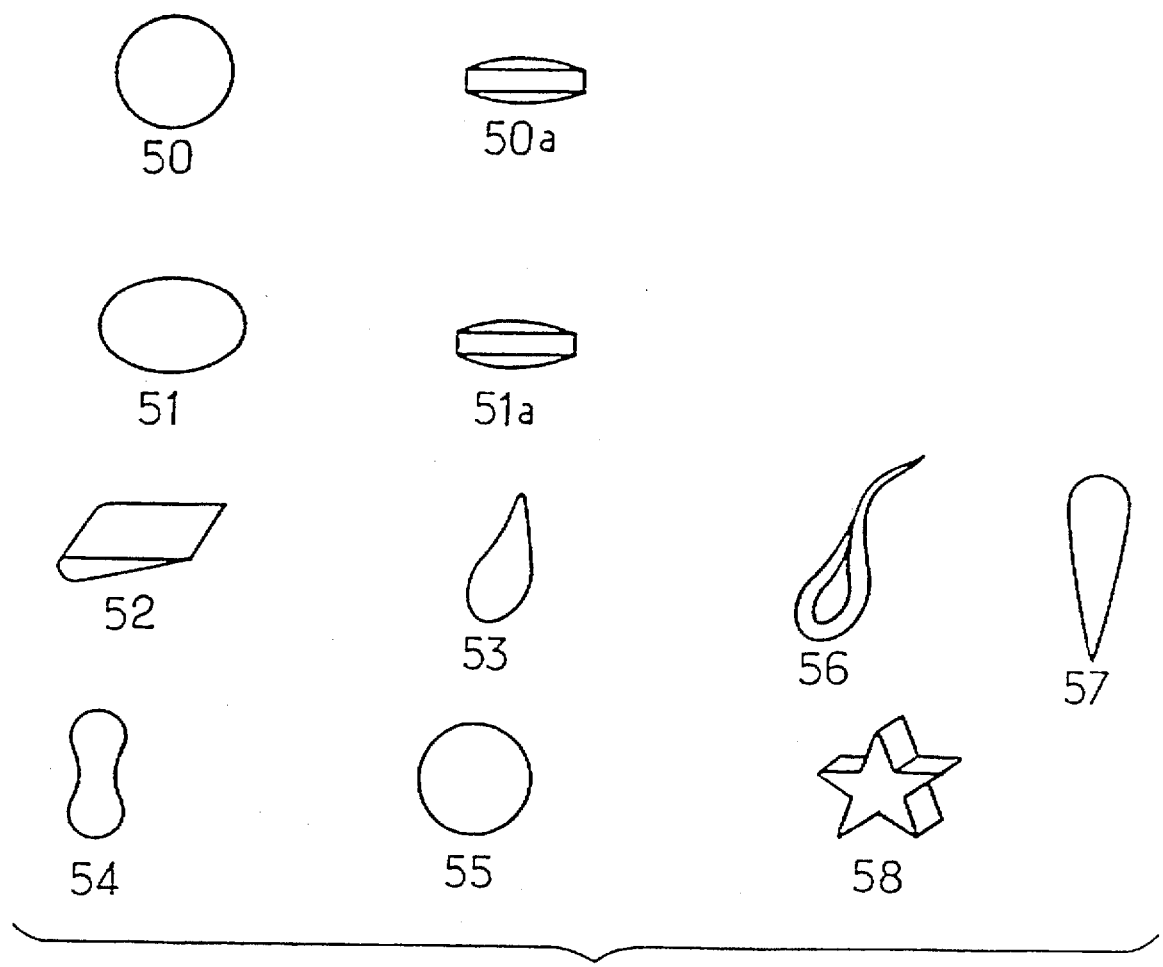
FIG_7
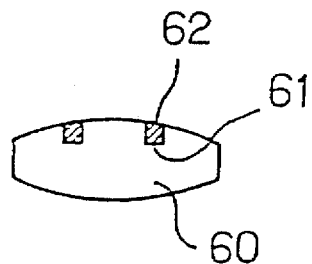
FIG_8

PROCESS FOR THE MANUFACTURE OF AN OBJECT DISPLAYING A MESSAGE

BACKGROUND OF THE INVENTION

1. Field of the Invention

The present invention concerns a process for the manufacture of an object displaying a message, information, advertising, etc including a transparent body carrying the message, etc.

2. Description of the Prior Art

In the field of manufacture of glass balls containing in their interior any kind of design, it is usual to distinguish two categories of techniques. The first technique, usually applied to the manufacture of balls with no value such as marbles for children, entails mixing the glass, before the ball is formed, in an arbitrary manner with one or more materials with different colors, often also glass, in order to obtain coloured inclusions within the ball, which is often of clear glass.

Although this technique can be used to manufacture balls with an arbitrary design, in which case it is entirely satisfactory, it cannot be used to manufacture balls containing a specific design because the arbitrary mixing of the coloured material with the glass of the ball cannot produce a definite design.

There is also another technique for manufacturing balls incorporating an artistic design, for example of enamel, which technique entails manual preparation of the enamel design by an artistic and costly process followed by the introduction of the design, which is carried out on a glass medium, into the molten glass in order to surround the medium with molten glass and then form the ball or other object.

An object of the present invention is to create a process for the manufacture of balls of transparent glass, for example, which carry in their interior a definite design, which process should be usable on an industrial scale to manufacture large numbers of such balls at negligible cost, for example to produce balls carrying advertising, messages or other information.

SUMMARY OF THE INVENTION

In accordance with the present invention, the above object is achieved by a method as defined above which is characterized in that it comprises the following steps: preparation of a support for said message having dimensions less than the dimensions of the support object; manual or automatic application of the message to said support; introduction of the support carrying said message on its surface into a molten transparent material so as to surround the support with a sufficient quantity of molten transparent material to enable subsequent formation of a transparent body which completely surrounds said support; and formation of the transparent body by thermomechanical means.

In a preferred embodiment of the invention the object carrying the message is a glass ball. Said support and the molten material are advantageously glass of the same kind. The object carrying the message can instead be a carafe stopper, the bottom of a drinking glass or the bottom of a plate.

Alternatively, the molten material that will subsequently constitute the ball is transparent glass and the support can be a material having thermal expansion properties compatible with those of said glass, for example copper, gold, platinum, silver, ceramic, enamelled porcelain.

The message can be applied to one or both sides of the support by silkscreen printing, by application of a transfer, by sandblasting or by etching with an acid a multilayer glass of different colors using different masks for each color in the cloisonnée technique in which positive or negative relief printing is applied to the support in a state in which it can be formed and the relief is filled with enamel.

If the message is silkscreen printed on the support, the latter is heated after application of the message to fix the latter to the support. If the message is applied in more than one color the support is heated to a temperature of approximately 150° C. after each application of a different color.

In one particular embodiment of the present invention the support is constituted of thin convex glass wafers to which the message is applied cold.

The wafers can be manufactured by forming a stream of glass out of a pool of molten glass and the message can be applied to the hot stream after which the stream is covered with glass that can be formed and cut into individual supports or wafers.

Before covering the supports with the molten glass, the supports are heated to approximately 500° C. to 600° C. to obtain a perfect interface between the glass of the support and the molten glass. This can be achieved by moving the support into the furnace for melting the glass of the envelope.

In a different embodiment of the present invention the support can be a glass figurine manufactured with a blowtorch. In this case the figurine can be formed in colored glass which is covered with clear glass or glass that is a different color or a different shade of the same color, each concave part of the support (the figurine) being filled with glass of the same kind as the covering glass, to form an insert of simple convex shape.

The message can be applied to the support by application of a transfer by applying to the support a carrier of a thermodegradable material carrying the message in the form of printing, enamelling, etc. The combination is then fired at a temperature between at about 500° C. and about 800° C. to eliminate the thermodegradable material and to fix the message to the support.

The support can be introduced into the molten material manually by taking up the support, previously heated to about 500° C. to about 600° C., at the end of a hot spinning rod and dipping it into the gob to extract from the latter a sufficient quantity of glass to form a ball around the support, after which the ball is formed manually.

In a further embodiment of the present invention the support is introduced into the molten material in the following stages: installation of a ceramic guide member inside a pool of molten glass above and near its outflow orifice, or below the pool so that the glass flowing out of the pool flows over the exterior wall of said guide, introduction of the supports into the interior of said guide so as to enable removal of the supports through the bottom opening of the guide covered with molten glass flowing down over the exterior wall of the funnel.

The stream of glass incorporating said supports can be cut by scissors to separate each individual support with molten material around it.

The following procedure can instead be used: prepare a stream of molten glass out of a first pool disposed at a relatively high position; pass said stream between two flattener and/or drive rollers; pass said flattened stream over one or more print rollers, inking rollers or enamel applicator rollers or past an enamel spray gun to apply the message thereto; pass the flattened stream carrying the message into said ceramic guide installed in a second pool of molten glass disposed under the first pool so as to enclose the stream with molten glass; cut the composite stream produced in this way into individual pieces each of which incorporates a part of the stream carrying the message which constitutes a complete message, and form a ball from each of said pieces by mechanical means.

The mechanical formation of the balls can be achieved by passing individual quantities of glass at a temperature at which the glass can still be formed between two lead screws and by causing the somewhat round bodies leaving the lead screws to roll in a rolling passage until the bodies are cooled to a temperature below the hardening temperature.

The present invention also consists in transparent objects carrying messages, information, advertising, etc including a transparent body which includes within its interior said message, information, advertising, etc, which object is characterized in that it is manufactured by one of the processes described hereinabove.

Finally, the invention consists in a transparent object carrying a message, information, advertising, etc having a transparent body which includes said message, information, advertising, etc which object is characterized in that the message, etc is inside the object, in which it is suspended with no visible means of support, or on a visible support having a required shape, color and/or texture.

The invention will now be described in more detail with reference to the drawings.

BRIEF DESCRIPTION OF THE DRAWINGS

FIG. 1 shows a ball of the invention carrying in its interior a message which appears to be suspended in space.

FIG. 2 shows a support carrying the message before its inclusion in the ball.

FIG. 5 shows an alternative embodiment of the present invention.

FIG. 6a and 6b show details of the manufacture of the balls by the process shown in FIG. 3.

FIG. 7 shows various forms of the support.

FIG. 8 is a diagram showing application of the message to the support by a so-called cloisonnée process.

DETAILED DESCRIPTION OF THE PREFERRED EMBODIMENTS

Figure 3:
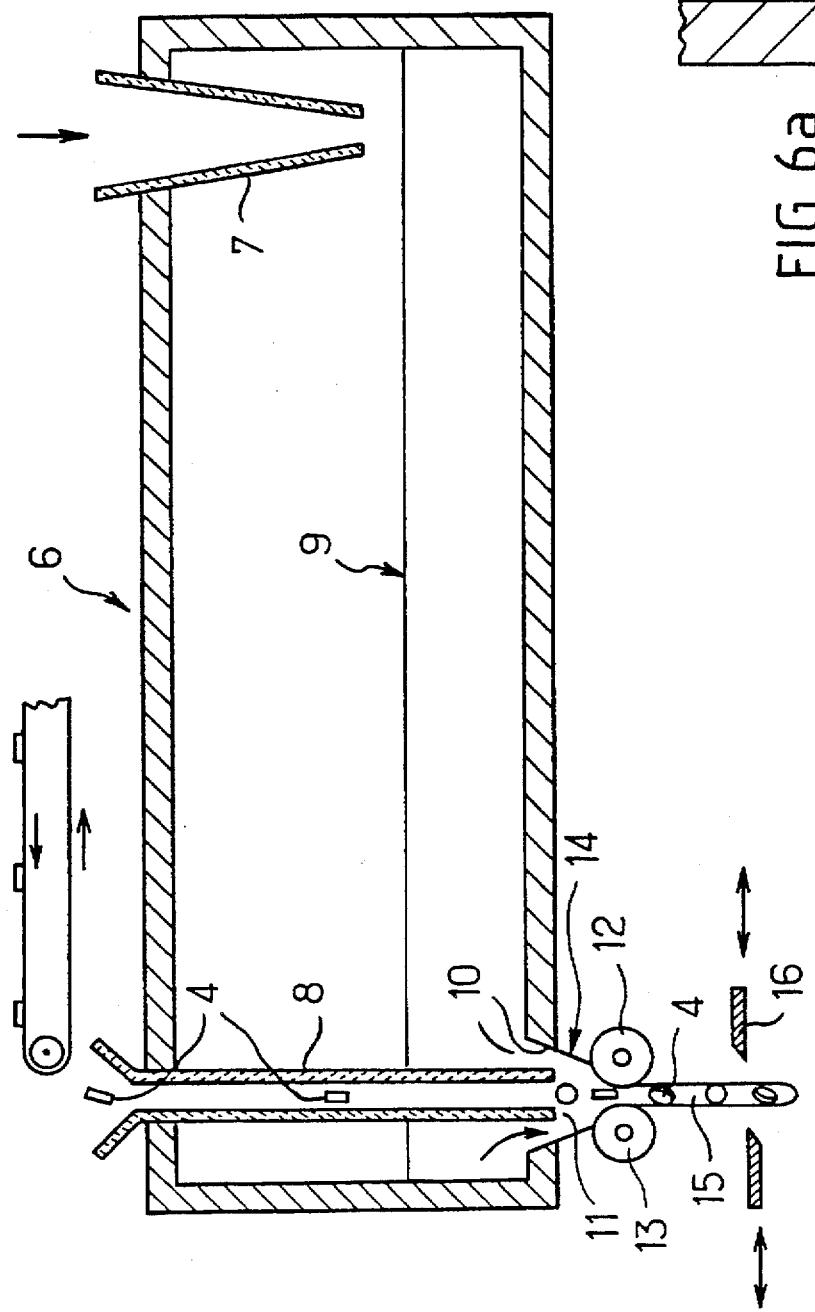
FIG. 3 shows a first embodiment of the process of the present invention.

Referring now to the drawings, FIG. 1 shows a glass ball 2 which contains in its interior a message 3 which is represented by the letters A, B, C.

The ball constitutes an object 1 carrying a message which can comprise any required information, advertising or any other design to be introduced into a transparent ball. The word "message" as used in the remainder of this specification must be understood as including any written or drawn information that can be produced by a process enabling it to be reproduced in large numbers economically.

FIG. 2 shows a wafer whose general shape is that of a domed disk and whose diameter is usually slightly less than that of the ball 2 from FIG. 1. Its diameter can naturally be substantially the same, greater than or considerably less than that of the ball 2, depending on the required optical effect.

The disk 4 has a thickness 5 which can be chosen to enable the process of manufacturing the ball 2 to be executed without problems, in particular in a manner resistant to application of the message 3 to the surface of the disk 4 and which also provides a mechanical support for the message 3, which support must be sufficiently stable to preserve the integrity of the message 3 during high-temperature steps of the process of the present invention.

FIG. 3 shows a pool 6 which is partly filled with a mass of molten glass 9 usually called the "gob".

The pool 6 includes a first funnel 7 through which the raw material such as silicon oxide is introduced in the form of sand mixed with the other components routinely used in making glass. The pool 6 also has in its lower part an opening 10 from which exits a stream of molten glass the function of which is explained below.

The mass of glass 9 in the pool 6 is heated to a temperature of around 1 200° C. by a conventional heating installation which is not shown in FIG. 3.

The pool 6 also includes a second guide 8, manufactured from a ceramic material, like the funnel 7; the guide 8 has an opening at the top for introduction of disks 4 like that shown in FIG. 2, which disks can exit a bottom opening 11 at the bottom end of the guide 8 one by one. The opening 11 is level with the orifice 10 in the bottom of the pool 6. The wafers or disks 4 are distributed in such a way that the wafers are introduced into the opening at the top of the guide 8 one by one, at sufficiently long intervals to prevent congestion impeding exit of the balls from the opening at the bottom of the guide 8. They must leave the guide virtually as soon as they reach the bottom of the guide to prevent them melting as a result of spending too long in the guide 8.

Below the opening 10 in the pool 6 is a pair of rollers 12 and 13 which form the stream 14 of molten glass to a thinner shape, yielding a stream 15 comprising the disks 4 at certain intervals. On the downstream side of the rollers 12 and 13, scissors 16 cut the stream 15 between two disks 4 to produce individual pieces each containing a disk 4 covered with glass that can be formed The processing of the stream 15 is described in more detail below with reference to FIGS. 6a and 6b.

Figure 4:
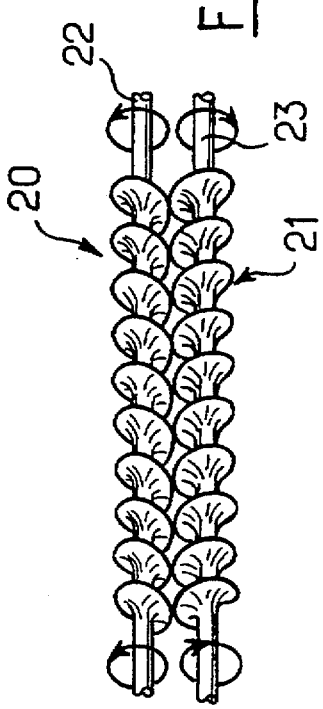
FIG. 4 shows part of the equipment for mechanical formation of the balls.

On the downstream side of the scissors 16 the individual pieces of the stream 15 drop or are guided between two lead screws 20 and 21 (FIG. 4). The lead screws 20 and 21 are carried by two shafts 22 and 23 which turn in opposite directions for the reasons explained below.

The disks 4 as shown in FIG. 2 are produced from droplets of molten glass or by cutting a stream of molten glass flowing from a pool (not shown); the droplets or the cut pieces of the stream are flattened by one or two rollers and then cooled to form the disks as shown in FIG. 2. Of course, these disks can be made by any other suitable method, for example pressing, molding, injection molding, etc.

The message 3 is then applied to them by a method selected from the following possible methods.

By silkscreen printing: the single-color or multicolor message is applied to the disk. After each color is applied the disk or wafer is heated to 150° C. to fix the design or the message to the wafers. Of course, if the message is in one color only, a single heating is sufficient.

By partial removal: the message can equally well be applied to the wafers by a removal process for which a multilayer wafer is produced in which each layer is a different color. A mask is then applied to the first layer and the parts that are not covered by the mask are removed by sandblasting or etching with an acid. Subsequent application of a respective mask for each color produces a multicolor design by removing at each point of the design the layers of glass of colors other than the required color.

By the cloisonnée process. FIG. 8 shows application of the message to the wafers 60 by a technique known as cloisonnée in which a negative relief 61 is imprinted on the surface of the wafer 60 and subsequently filled with enamel 62.

By application of a transfer: the message can be applied to the support by application of a transfer by applying to the support a carrier of thermodegradable material carrying the message in the form of printing, enamel, etc. The combination is then fired at a temperature between about 500° C. and about 800° C. to fix the message to the support.

The wafers are then introduced into the funnel 8 of the pool 6 and leave the opening 11 at the bottom individually, each being covered with molten glass leaving the pool 6 via the orifice 10.

The mass of molten glass leaving via the orifice 10 and containing a series of wafers is formed into a thin stream 15 by the two rollers 12 and 13 and cutting the stream 15 into individual pieces between adjacent wafers 4 produces the basic quantities for the subsequent formation of the balls by a thermomechanical process, i.e. by mechanical shaping of the glass surrounding the wafers 4 which is still in a state in which it can be formed.

As shown in FIG. 4, the distance between two turns of the two lead screws 20 and 21 is approximately equal to the diameter of the finished balls and the pieces of the stream 15 into which the latter is cut by the scissors 16 drop between the two lead screws which rotate in opposite directions to procure a kind of forced rolling of the cut pieces of the stream 15 to impart thereto a basic shape from which a sphere can be obtained.

These generally spherical shapes essentially contain in their interior the wafers 4 which, in one specific embodiment of the present invention, are made of the same glass as the gob 9, so that the interface between the body of the wafers and the mass of glass surrounding them is completely eliminated, so that the message 3 seems to be freely suspended with a homogeneous mass of glass.

The already generally spherical pieces leaving the two lead screws 20 and 21 have their shape further refined in a free rolling guide, the balls leaving the latter having a more or less perfect shape and surface finish.

Of course, it is possible to use wafers of a different glass or a different color than the glass from the gob 9 or any other material with thermal expansion properties compatible with those of the glass of the gob 9.

Such materials include copper, gold, platinum, silver, ceramic, enamelled porcelain, etc.

FIG. 5 shows a different embodiment of the process of the present invention for manufacturing balls, which uses a first pool 30 partly filled with molten glass 45 and which includes a funnel 31 for introducing the raw material.

The pool 30 has an outflow orifice 32 from which a stream 33 of molten glass leaves the pool, being then taken up between two rollers 34 and 35 to form a thin flat stream 36 guided between two rollers 37 and 38 at least one of which is a print roller for printing onto the flat stream 36 the message shown in FIG. 2.

The actual distance between the pairs of rollers 34, 35 and 37, 38 is of course sufficiently long to enable sufficient cooling of the stream 36 to enable application of the message by the rollers 37 and 38.

The rollers 37 and 38 can be inking rollers, enamel applicator rollers, etc. In a different embodiment of the invention the enamel can be applied by means of a spray gun.

It is equally feasible to provide a first pair of rollers for printing the design or message in positive or negative relief followed by a second pair of enamel applicator rollers or by an enamel spray gun.

The stream 41 leaving the pair of rollers 37, 38 is guided into a ceramic channel 39 passing downwards through a second pool 40 partly filled with molten glass 44. The opening at the bottom of the channel 39 is near the outflow orifice 42 of the pool 40.

In a manner similar to that described with reference to FIG. 3, the flattened and printed stream 41 passing through the channel 39 is loaded with molten glass at the opening at the bottom of the channel 39 when the stream 41 leaves the latter to pass between the two rollers 12 and 13 to produce a composite stream 45 comprising an interior layer constituted by the stream 41 and two layers of molten glass, one on each side of the stream 41.

The composite stream is cut into pieces by the scissors 16 between two consecutive messages printed on the stream 41.

The scissors 16 can be operated manually by an operative watching the printed parts of the stream 41 move past, or by any automated means such as an optoelectronic trigger device.

The pool 40 also includes a funnel 43 for introduction of the raw material for making the glass and the pools 30 and 40 are provided with heating installations (not shown).

Figure 6A:
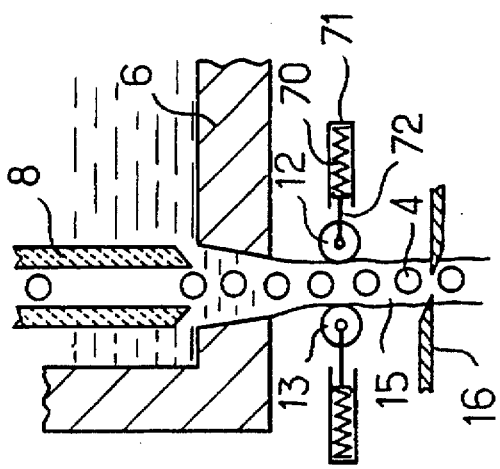

FIG. 6a shows part of a specific embodiment of the control system for the scissors 16 in which the supports for the rollers 12 and 13 are mobile so that the thickness of the stream 15 can be varied so that the latter is thinner between two wafers 4. This variation is obtained by means of springs 71 accommodated in cylinders 70 and pushing against pistons 72 carrying the rollers 12 and 13.

When a wafer 4 passes between the two rollers 12 and 13 they are pushed further apart than when a part of the stream 15 comprising only molten glass passes between them and the scissors 16 can therefore be controlled with reference to the markers constituted by the varying diameter of the stream 15.

FIG. 6b shows part of the treatment of the outflow of molten glass from the pool 6 to a stream preparation station comprising two notched wheels 74 and 75 disposed one on each side of the stream so as to take up the wafers 4 in their recess 78 as they rotate. Downstream of these notched wheels generally rounded parts 76 containing the wafers 4 are separated from each other by thin parts of the flow of glass formed by the ends 79 of the protrusions on the wheels 74 and 75.

In a manner that is not shown, operation of the scissors can be controlled by a feeler disposed between the notched wheels 74, 78 and between the scissors 16, control being based on the distance between the feelers and the scissors and the rate at which the stream passes between these two devices.

Heating means 80, 80' are provided between the feeler and the scissors 16 to ensure that the glass remains sufficiently soft for the remainder of the treatment.

Of course, the same feeler system can be used to control the scissors 16 in the FIG. 6a arrangement, in which the system of supports 70, 71, 72 for the rollers 12 and 13 can itself constitute the feeler.

FIG. 7 shows various possible shapes for the wafers 4 from FIG. 2, the simplest shape being a disk 50 having a slightly domed section 50a of which either the domed surface or the cylindrical edge is intended to receive the message.

The wafer 50 is circular in plan view.

An alternative wafer 51 has an oval shape and also has a domed section 51a.

In advantageous embodiments of the process of manufacture the wafer can have different shapes, however, for example a wedge shape 52, a droplet shape 53, a Prince Rupert's drop shape 56, a nail shape 57, a peanut shape 54, a ball shape 55 or any other complex profiled shape such as a star 58, for example.

When the wafer is made from the same glass as the gob that subsequently surrounds the wafer, its shape is immaterial as the wafer will be completely embodied in the final mass of the ball, but it may be desirable to choose a specific shape for the wafer if a particular disposition is required for the message which appears to be suspended in empty space inside the finished ball, or if the wafer is made from a different substance, possibly only of a different color, than the glass of the gob to obtain a visible support for the message inside the ball.

Introduction of the wafer 60 into the molten glass to form a glass ball around it will also cause the wafer 60 to disappear to show only the message represented by the enamel 62 inside the ball, which message will appear to be suspended in space inside the ball.

The wafers can equally well be introduced manually into the mass of molten glass to form a ball by taking up each individual wafer heated to a temperature between 500° C. and 600° C. at the end of a hot spinning rod and then dipping the wafer into the gob from which is extracted a small quantity of glass sufficient to form the ball which is thereafter finished by the conventional methods.

The invention is described hereinabove with reference to various possible embodiments, it being understood that many modifications and improvements can be made thereto by the person skilled in the art without departing from the scope of the present invention.

There is claimed:

1. A method for manufacturing an object comprising a transparent body supporting a message, information or advertising comprising the steps of:

preparing a support having dimensions less than the transparent body;

applying onto said support a thermodegradable material carrying the message;

firing at about 500 to 800° C. said support and said thermodegradable material carrying the message to calcinate the thermodegradable material and to fix said message to said support forming a fired support; and forming said transparent body around said fired support, wherein said fired support having said message on one surface is introduced into a molten transparent material so as to surround said fired support with a sufficient quantity of said molten transparent material to enable subsequent formation of said transparent body which completely surrounds said support and shaping said transparent body by thermomechanical forming, and wherein said molten transparent material is glass and the introduction of said support into said molten material is effected by the following steps:

flowing a glass stream out of a pool of molten glass onto the exterior wall of a ceramic guiding member located inside said pool above and near its outflow orifice, and introduction of a plurality of said fired supports into the interior of said guiding member so as to enable said fired supports to exit the opening at the bottom of said guiding member covered with molten glass flowing down over said outside wall of said guiding member.

2. The method according to claim 1, wherein said stream of glass incorporating said fired supports is cut by scissors into separate fired supports each with molten material around it.

* * * * *